United States Patent [19]
Cruchelow et al.

[11] 4,291,645
[45] Sep. 29, 1981

[54] PET SHELTER

[76] Inventors: Wayne L. Cruchelow; Marilyn Cruchelow, both of 1315-39th St., Des Moines, Iowa 50311

[21] Appl. No.: 157,563

[22] Filed: Jun. 9, 1980

[51] Int. Cl.³ .................................................. A01K 1/03
[52] U.S. Cl. ...................................................... 119/19
[58] Field of Search ................ 119/15, 19, 20, 110; 70/91, 94, DIG. 64

[56] References Cited

U.S. PATENT DOCUMENTS

| | | | |
|---|---|---|---|
| 1,748,598 | 2/1930 | Dermody | 70/DIG. 64 |
| 1,779,491 | 10/1930 | Rau | 70/DIG. 64 |
| 3,738,322 | 6/1973 | Smith | 119/15 |
| 3,962,994 | 6/1976 | Petrucciani | 119/19 |
| 4,021,975 | 5/1977 | Calkins | 119/19 X |
| 4,224,899 | 9/1980 | Cruchelow et al. | 119/19 |

Primary Examiner—G. E. McNeill
Assistant Examiner—Robert P. Swiatek
Attorney, Agent, or Firm—Zarley, McKee, Thomte, Voorhees & Sease

[57] ABSTRACT

The pet shelter of the present invention is adapted to be mounted over the basement window opening of a house. The shelter has a double swinging door which can swing inwardly and outwardly. A locking bar pivots from a vertical position to a horizontal position in retentive engagement with the swinging door. A flexible cord is attached to the lock bar and extends through a hold in the house wall to the interior of the house where it can be manipulated to raise and lower the locking bar for locking and unlocking the swinging door.

5 Claims, 5 Drawing Figures

PET SHELTER

BACKGROUND OF THE INVENTION

This invention relates to an improvement in a pet shelter.

Numerous types of pet shelters have been provided for sheltering pets from the weather. One problem encountered with these pet shelters, however, is the inability of the pet owner to have access to the pet shelter from inside the house. Attempts have been made to provide double swinging doors in one of the house walls so that the pet can enter the house and leave at will, but these are not completely satisfactory if it is not desired to permit the pet to enter the house. Furthermore, these double swinging doors often are not efficient to prevent the loss of heat energy from the house.

Another disadvantage of the use of swinging doors in house walls is the accessibility that these doors provide for thieves or burglars.

Therefore, a primary object of the present invention is the provision of an improved pet shelter.

A further object of the present invention is the provision of a pet shelter which can be attached over a basement window so as to permit access to the interior of the shelter from within the house.

A further object of the present invention is the provision of a pet shelter which minimizes the escape of energy from the house while at the same time permitting the interior of the shelter to be at least partially warmed from within the house.

A further object of the present invention is the provision of a pet shelter which permits the owner to give the pet food and water from within the house.

A further object of the present invention is the provision of a pet shelter which can be easily locked from within the home.

A further object of the present invention is the provision of a device which is economical to manufacture, durable in use and simple in operation.

SUMMARY OF THE INVENTION

The present invention utilizes a three sided shelter which has an open side adapted to be fitted over a basement window of a home. The animal shelter includes a double swinging door which can swing inwardly and outwardly so as to permit the pet to enter and leave the shelter whenever it desires to do so. A locking bar is connected for pivoting movement adjacent the double swinging door from a vertical position to a horizontal position. In the horizontal position the locking bar extends transversely across the door and retentively engages a bracket on the door so as to prevent the door from swinging either inwardly or outwardly. A flexible string or cable is attached to the locking bar and extends through a hole formed in the house wall to the interior of the house. Thus, by grasping and pulling the string, the pet owner can raise or lower the bar to permit locking and unlocking of the double swinging door.

DETAILED DESCRIPTION OF THE INVENTION

Figure 1:
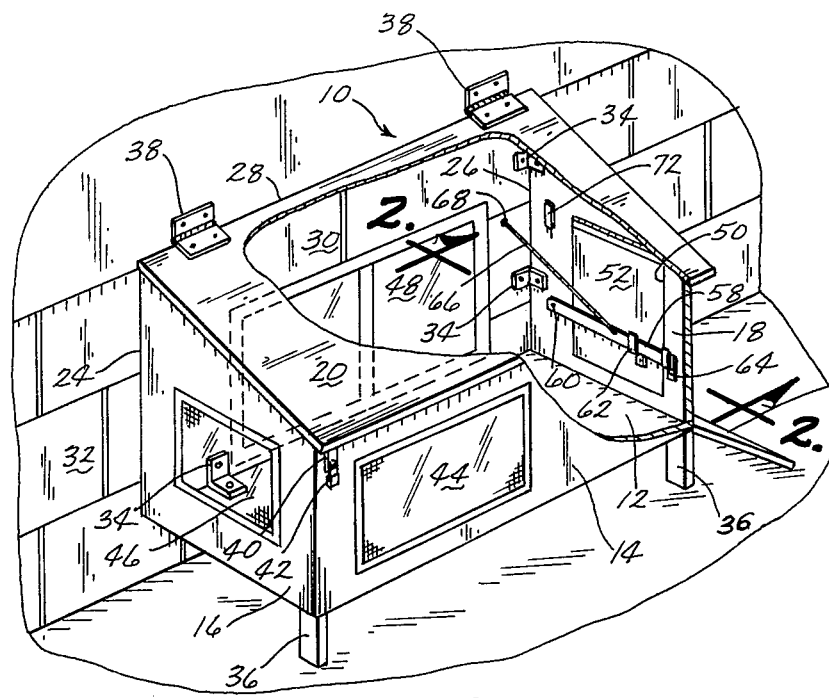
FIG. 1 is a perspective view of the present invention with a portion thereof cut away.

Referring to the drawings, the numeral 10 generally designates the pet shelter of the present invention. Shelter 10 comprises a floor 12, a front wall 14, end wall 16, 18 and a roof 20. The floor 12, end walls 16, 18 and roof 20 each include rear edges designated by the numerals 22, 24, 26 and 28, respectively, which abut against the outer surface 30 of a foundation wall 32. Rear edges 22, 24, 26 and 28 are held in abutting engagement with outer surface 30 of foundation wall 32 by means of a plurality of L-shaped brackets 34. Other means of securement may be used without detracting from the invention. For example, shelter 10 may be provided with a rear wall which can be secured to the foundation wall 32 by screws, anchor bolts or other conventional means.

A pair of legs 36 support the forward edge of bottom wall 12 above the ground. Roof 20 is hinged at its rearward edge to wall 32 by hinges 38 so as to permit the roof to be lifted for access to the interior of the pet shelter. A locking bracket 40 adapted to accommodate a padlock 42 may be provided on the forward edge of roof 20 so that the roof may be locked to prevent burglars from gaining access to the house.

Front wall 14 and end wall 16 are each provided with window openings 44, 46, respectively, each of which may be covered with screens, plastic or glass, depending upon the temperature and weather conditions. Shelter 10 is secured over a window opening 48 in a foundation wall 32 of the house. This window opening normally can be opened from the inside of the house so as to permit the owner to have access to the pet within the shelter. The most desirable arrangement is to provide a screen in basement window opening 48 so that the window may be left open to provide communication between the interior of the house and the interior of shelter 10 at all times. This permits the pet to have access to the warmer air within the house and also to have sound and visual contact with his owner located within the house.

Figure 3:
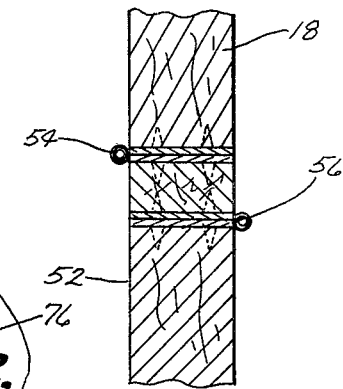
FIG. 3 is a sectional view taken along line 3—3 of FIG. 2.
Figure 4:
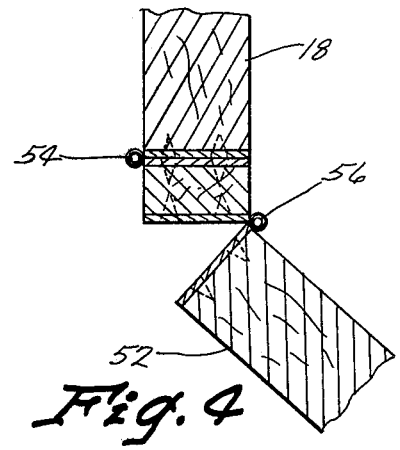
FIG. 4 is a view similar to FIG. 3 showing the double swinging door pivoting inwardly.
Figure 5:
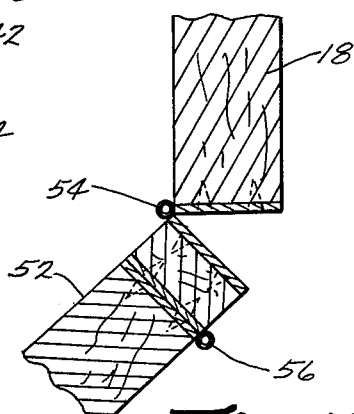
FIG. 5 is a sectional view similar to FIG. 3 showing the double swinging door pivoting outwardly.

End wall 18 is provided with a pet door opening 50. Hinged within this opening 50 is a pet door 52. Door 52 is hinged at its upper end by a double hinge mechanism designated by the numerals 54, 56 (FIG. 3). Gravity normally holds door 52 in the vertical position shown in FIG. 3. However, when the pet pushes the door outwardly it hinges about hinge 56 as shown in FIG. 4, so as to permit the pet to leave the shelter. Conversely, when the pet pushes from the outside in on the door, the door pivots about hinge 54 as shown in FIG. 5, so as to provide the pet access to the interior of shelter 10.

Figure 2:
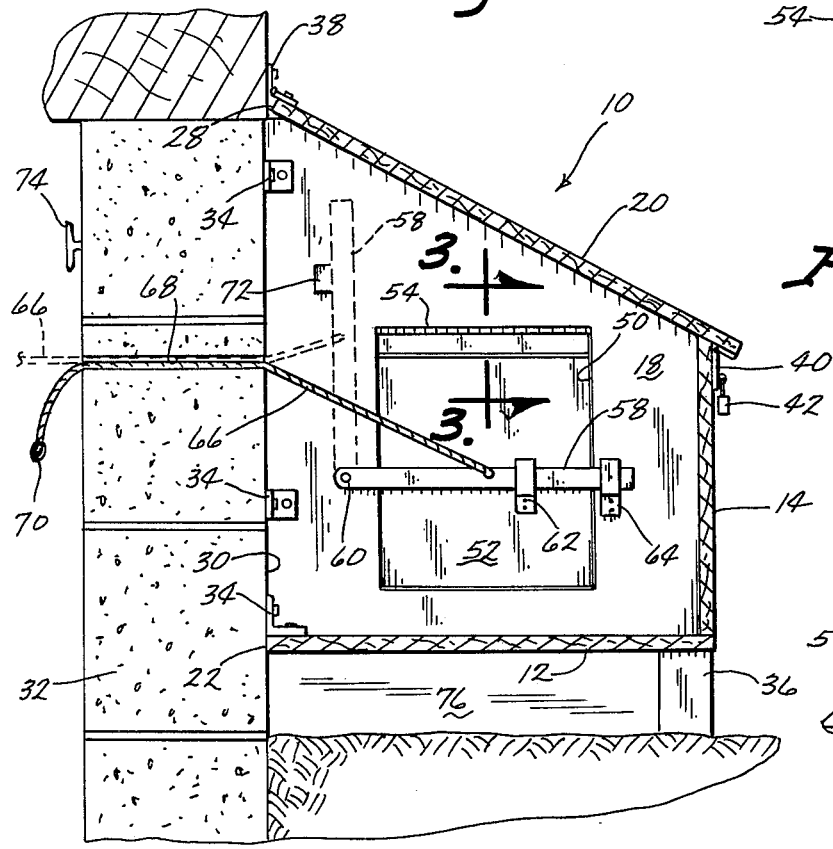
FIG. 2 is a sectional view taken along line 2—2 of FIG. 1.

A lock bar 58 is pivotally mounted about an axis 60 within the interior of end wall 18. Bar 58 pivots about horizontal axis 60 from a position shown in shadow lines in FIG. 2, to the horizontal position shown in solid lines in FIG. 2. A pair of L-shaped bar receiving brackets 62, 64 are attached to the interior surface of door 52 and the interior surface of wall 18 respectively. These brackets 62, 64 receive bar 58 in its horizontal position and retentively engage the bar so as to prevent the swinging movement of door 52 about hinges 54, 56. Thus, when bar 58 is in its horizontal position, it locks door 52 against any swinging movement.

A string or flexible cord 66 is secured at one of its ends to bar 58, and extends through an opening or hole 68 to the interior of foundation wall 32. This string may be grasped at its inner end 70 and pulled to lift bar 58 upwardly to its upstanding position shown in shadow lines in FIG. 2. A stop 72 prevents bar 58 from pivoting completely to the vertical position. Thus, bar 58, if left to fall freely, would automatically fall by force of gravity from the position shown in shadow lines in FIG. 2 to the horizontal position shown in solid lines. In order to hold bar 58 in the upstanding position, the owner ties the inner end of string 66 to a cleat 74 mounted on the interior surface of wall 32. A small ramp 76 is provided on the exterior of door opening 50 to facilitate the entry and exit of the pet from shelter 10.

Thus, it can be seen that the device accomplishes at least all of its stated objectives. The pet shelter can be attached over a basement window so as to permit access to the interior of the shelter from within the house. Furthermore, the pet shelter minimizes the escape of energy from the house, while at the same time permitting the interior of the shelter to be at least partially warmed from within the house. The owner can give the pet food and water from within the house without having to go outdoors. If desired, the owner can lock the swinging door 52 and also lock the roof 20 to make the entire shelter secure from thieves or burglars who might try to gain access to the interior of the house through basement window 48. This locking can be accomplished easily from within the home. The device is economical to manufacture, durable in use and simple in operation.

What is claimed is:

1. A pet shelter adapted to be mounted over an opening in a house wall, said wall having an interior surface and an exterior surface, said opening having an openable window therein, a small hole in said house wall providing communication between said interior and exterior surfaces thereof, said shelter comprising:

a housing having a top wall, a front wall, and opposite side walls, said top wall, said floor and said side walls each having rear edges adapted to abut against said exterior surface of said house wall in surrounding relation to said opening therein;

one of said lateral side walls having a door opening therein; a door within said door opening;

hinge means connecting said door to said one lateral side wall for hinged swinging movement both inwardly and outwardly with respect to said one lateral side wall;

a lock bar pivotally mounted to said one lateral side wall for pivotal movement about a horizontal axis from a first position to a second position wherein said lock bar extends transversely across said door opening;

first bracket means on said door for retentively receiving said lock bar in said second position whereby said lock bar operates with said first bracket to hold said door against swinging movement when said lock bar is in its said second position;

an elongated flexible control member having one end thereof connected to said lock bar at a point spaced from said pivotal axis thereof, said control member being adapted to extend through said small hole in said house wall so that the other end of said control member is on the interior surface of said house wall whereby said control member may be grasped and manipulated to cause movement of said lock bar between said first and second positions.

2. A pet shelter according to claim 1 wherein a second bracket is fixed to the interior surface of said lateral side wall, said second bracket retentively engaging said lock bar when said lock bar is in said second position.

3. A pet shelter according to claim 1 wherein said lock bar is upstanding when in said first position.

4. A pet shelter according to claim 3 wherein said lock bar is slightly out of vertical in the direction of said second position whenever said lock bar is in said first position whereby gravity urges said lock bar towards said second position and said control member moves said lock bar to said first position against gravity.

5. A pet shelter according to claim 1 wherein said top wall is hinged along said rearward edge thereof to said exterior surface of said house wall.

* * * * *